April 21, 1970 R. L. MERSING 3,508,014

MULTILAYERED MAGNETIC TRANSDUCER GAP SPACER

Filed June 27, 1967

INVENTOR.
ROGER LEWIS MERSING

BY Eber J. Hyde

ATTORNEY

United States Patent Office 3,508,014

Patented Apr. 21, 1970

3,508,014
MULTILAYERED MAGNETIC TRANSDUCER GAP SPACER

Roger L. Mersing, Willoughby, Ohio, assignor to Clevite Corporation, a corporation of Ohio Filed June 27, 1967, Ser. No. 649,199
Int. Cl. G11b *5/24*
U.S. Cl. 179—100.2 15 Claims

ABSTRACT OF THE DISCLOSURE

There is disclosed a magnetic transducing head for recording and/or reproducing high frequency signals having a transducing gap filled with a composite structure comprised of a film of insulating material deposited on the face portions of each pole piece, an intermediate bonding layer intimately secured to the outer face of the film of insulating material away from the pole face, and an electrically conductive coating intimately secured to the outer faces of the intermediate bonding layer and completely filling the transducer gap. The intermediate bonding layer characteristically adheres to both the film of the insulator and the conductive coating, and also reduces the specific resistivity of the conductor below the value it would have if the conductive coating were bonded directly to the film of the insulator.

This invention relates to a magnetic transducing head for recording and/or reproducing high frequency signals. More particularly, this invention relates to the transducing gap structure of a magnetic transducer head for operation with high frequency signals.

In the development of magnetic transducer heads to record and reproduce higher and higher frequencies, it is now well known in the art to make the gap length as short as possible and to make the shim of non-magnetic material, thereby to obtain better signal resolution. It has been found under some circumstances that these extremely short gaps undesirably decrease the magnetic flux linking a record member by shunting too great a portion of the flux across the gap, resulting in flux loss to the tape. Also, head designers have gone away from metallic shims due to severe eddy current problems.

In accordance with patent application, Ser. No. 519,896, filed on Jan. 11, 1967, by Edward C. Sand and assigned to the same assignee as the present invention, it has been found during a high frequency recording operation that the flux loss in the tape due to the shunting effect can be reduced by using shim materials in the gap of high electrical conductivity such as aluminum foil, and by properly insulating the conductive foil from the core structure of the head. Eddy current in the shim produced by high frequency signal flux in the core reduces the amount of shunting flux across the gap. This is achieved because the electrically conductive shim effectively increases the gap reluctance, and a flux pattern at the record member shows that a greater porportion of the total flux links the record medium if the shim is properly insulated from the pole pieces. In prior art laminated heads wherein uninsulated conductive foil was held in the gap by friction or by ordinary cement, the shim shorted out the laminations thereby greatly reducing the effective high frequency permeability of the laminations in the vicinity of the gap, thus increasing the high frequency reluctance of the core in the vicinity of the gap. The resulting permeability gradient in the core did not give a sharply defined gap. In addition, there had to be increased ampere turns in the coil to overcome this increased core reluctance. Comparable conditions exist during a reproducing operation wherein the source of flux is the record medium. Some of the flux bridges directly across the gap and does not link the coil around the core, and thereby is lost insofar as producing an output signal. Playback heads with short gap lengths may have leakage or bridging flux directly across the gap equal to or greater than the flux coupling the coil. Thus, half or more of the potential signal is lost.

In a reproducing head the flux lost across the gap can be partially recovered by decreasing the permeability of the gap by introducing therein a metal shim of high electrical conductivity which is insulated from the pole pieces, as taught by the E. Sand application Ser. No. 519,896. The decrease in gap permeability reduces the inductance of the core circuit, and this permits increased coil turns before undesirable circuit resonance is encountered. With increased flux cutting the coil and with an increased number of coil turns, higher output signal is obtained. The eddy current in the shim causes a larger proportion of the core flux to link the record member of the transducer gap, and excellent definition is obtained.

With increased emphasis on a reduced gap length, many transducer gap materials are applied by vacuum deposition and plating techniques. In the preparation of magnetic transducing heads for high frequency application by such techniques, problems have arisen in assuring a firm and intimate bonding of the conductor and insulator in the transducer gap. At high frequencies, if a firm bond has not been made, the insulator or conductor may become misaligned which causes the core flux to be altered in the area of the record medium.

Therefore, an object of the invention is to form a firm bonding of the composite materials in the transducer gap and thereby reduce the possibility of misalignment of the conductor therein during high frequency operation.

Another object of this invention is to provide a magnetic transducer head for recording high frequency signals wherein the gap structure causes a larger percentage of the available flux in the recording head to link a record member adjacent to the gap. Furthermore, an object of the invention is to provide a magnetic reproducing head wherein an increased percentage of flux available from the record member is available to produce a better output signal.

A further object of the invention is to provide a magnetic reproducing head wherein an intermediate layer bonds a conductor to an insulator and reduces the electrical resistivity of the conductor below what the resistivity would be if the conductor were directly secured to the insulator, making the resistivity as near to the resistivity of the bulk material of the conductor as possible.

Briefly, in accordance with one aspect of the invention, a magnetic transducer head is provided with composite structure in the transducing gap. The composite structure comprises a film of electrically insulating material intimately secured to the face portions of each of the pole piece portions, a thin intermediate bonding layer deposited on face portion of each of the films and intimately secured thereto, and a conductive coating intimately secured between the bonding layers and which fills the remaining central part of the transducer gap. The intermediate bonding layer is such that it both forms a secure bond with the film and the conductive coating and also reduces the specific resistivity of the conductive coating below that value which it would have if directly applied to the film of insulating material.

The invention will be better understood from the following description of a preferred embodiment to be read in conjunction with the acompanying drawing, and the features believed to be novel will be particularly pointed out in the appended claims.

Figure 1:
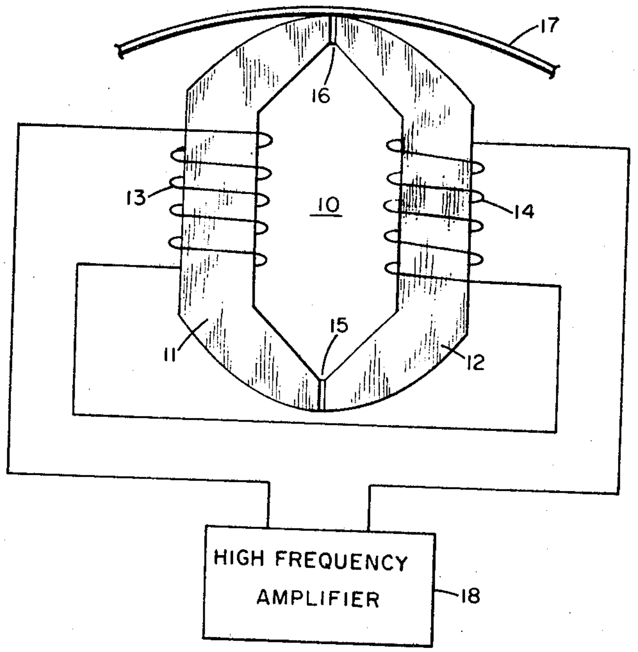
FIGURE 1 shows, schematically, a magnetic transducer head and circuit for recording and/or reproducing signals in the high frequency range.

Referring to FIG. 1 of the drawing, a transducing head is shown wherein a magnetic head 10 comprises two core or pole piece portions, 11, 12, with coil means 13, 14 associated therewith, as is known in the art. A rear gap 15 is formed between the core piece portions 11, 12 and a front gap, or transducing gap 16, is also formed, across which a moving magnetizable record member 17 is positioned during a transducing operation. The coil means 13, 14 are connected in series aiding relationship to amplifier means 18 capable of operation in the high frequency range. As is known in the art, during a recording operation the amplifier 18 energizes the coil means 13, 14 thereby establishing magnetic flux in the core piece portions 11, 12. Leakage flux at the transducing gap 16 couples the record member 17 to effect the recording. During a reproducing operation magnetic flux from the record member 17 flows in the core piece portions 11, 12 linking the coils 13 and 14, thereby, to generate a signal which is amplified by the amplifier 18 into a useful signal.

A problem which has existed in prior art recording heads, especially those with extremely short transducing gap lengths, is that the magnetic flux would tend to flow directly across the gap 16 without linking the record member 17. A non-magnetic shim has been placed in the transducing gap 16 to reduce the amount of flux which is undesirably shunted across the gap 16 thereby to increase the proportion of the flux which desirably links the record member 17. A comparable problem exists in reproducing heads.

Figure 2:
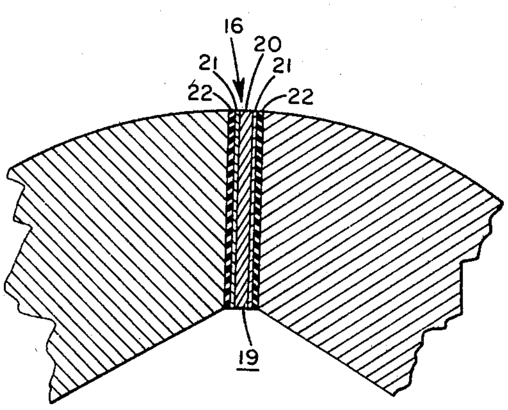
FIGURE 2 is a greatly enlarged cross-sectional view illustrating the transducing gap region of the head.

The magnetic transducer head and system of the present invention is for recording and/or reproducing high frequency signals. By high frequency signals is meant those frequencies in the range above about 200 kc. As shown in FIG. 2, the transducer composite structure 19 in the transducing gap 16 comprises an electrically conductive coating 20, one or more thin intermediate bonding layers 21, and one or more films of electrically insulating material 22 completely insulating the conductive coating 20 and bonding layers 21 from electrical contact with the pole piece portions 11, 12 or from any magnetic shield adjacent to the pole piece portions. The conductive coating 20 may be electrically grounded, but it should not be in electrical contact with any portion of the head which is not grounded, nor should it be grounded in such a way as to complete a conductive path around the core means linking the flux in the core means. Also, the conductive coating 20 must not be inductive coupled with any other head structures.

The electrically conductive layer 20 is preferably 25 millionths of an inch thick for playback heads and 50 millionths of an inch for recording heads. The conductive layer 20 is preferably of silver for the purposes of the present invention; however, other conductors such as gold, aluminum, and copper may be used.

The intermediate bonding layers 21 should have the characteristics of first making a substantial mechanical and chemical bond with the films of insulating material 22 while readily bonding with the conductive layer 20. Secondly, bonding layers 21 should reduce the specific resistivity of the conductive layer 20 below the value it would have if the conductor were directly bonded to the films of insulating material 22. In addition, layers 21 are preferably non-magnetic. It is well known that metallic films deposited by the method of evaporation usually show higher specific resistance than the metal in bulk. Bonding layers 21 are extremely thin, preferably about 25 Angstroms and are what is termed by some in the art as "flash" deposited on the films of insulating material 22. The intermediate bonding layer 21 or "flash" is preferably selected from a group consisting of titanium, chromium, hy mμ 80 (high nickel steel), titanium dioxide, and iron oxide.

The film of electrically insulating material 22 must have excellent insulating properties; ordinary cements for holding the conductive layer 20 in place will not suffice. The insulator must not be magnetic and it should be extremely thin in order not to unduly increase the length of the transducer gap 16 which would result in inherent disadvantages. The total width of the transducer gap 16 is preferably about 20 to 120 millionths of an inch and the total thickness of each of the two films 22 is approximately 5 millionths of an inch. The films of insulating material 22 may be selected from a wide variety of materials such as silicon, silicon monoxide, quartz, glass, mica, epoxy cements, and small glass or sapphire beads. The volume resistivity of the insulator is preferably about $1 \times 10^{12}$ ohm-cm., or better.

Figure 3:
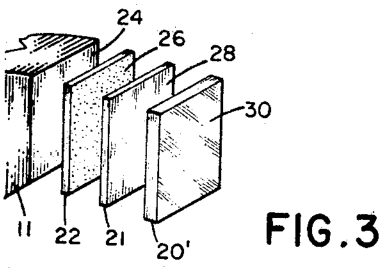
FIGURE 3 is an exploded view showing the face portion of one pole piece and the separate layers of the transducer gap composite structure.

As an illustration of one method of making the above described magnetic head (see FIG. 3), the planar end face 24 of pole piece portion 11 is lapped and polished flat to within 10 micro-inches of a completely planar surface. Pole piece 11 is placed in a vapor deposition chamber with the front end face 24 and rear end face (not shown) exposed. While this illustration of a method of making the head 10 uses vapor deposition in a vacuum several other methods are possible such as electro-deposition and sputtering. A vacuum is created in the chamber and the heat source material, preferably silicon monoxide, is heated and about 5 micro-inches deposited on both of the end faces. The rear end face is mechanically shielded to prevent any further deposition of material thereon. This leaves insulating film face portion 26 exposed to the subsequent material to be vapor deposited. The exposed insulating film face portion 26 does not readily adhere to silver which is the preferable conductive coating. This may be due to the differences in crystal structure and the internal stresses which build up in the silver when it is deposited to a thickness of over 10 micro-inches. Therefore, in accordance with the present invention, an intermediate bonding layer 21 preferably titanium is vapor deposited onto insulating face portion 26. The intermediate bonding layer 21 readily adheres to face portion 26 and forms bonding layer face portion 28. Bonding layer face portion 28 has the characteristic of readily adhering to a conductive coating such as silver. In addition, the silver appears to alloy where the bonding layer is titanium which would indicate diffusion of the two materials. Bonding layer 21 is preferably of a thickness of about 25 Angstroms. Finally, a conductive coating 20′ preferably of silver is vapor deposited on bonding layer face portion 28 to form a portion of the conductive layer 20′ having a conductive face portion 30. The conductive coating is preferably 25 micro-inches thick or greater and may be the entire conductive portion of the composite structure 19 or just a portion thereof. Thus, if the portion of conductive coating 20′ is the entire conductive coating, the opposing face portion is only coated or vapor deposited with an insulating layer and an intermediate bonding layer. Generally, the conductive coating is evenly divided on each of the pole piece portions, particularly when making recording heads, but clearly this is not essential.

In the above described method of making a magnetic transducer head, the preferable composite structure 19, that is, silicon monoxide as the films of insulating material, titanium as the intermediate bonding layer, and silver as the conductive coating, have been successfully made and have reduced the specific resistivity of the silver up to 10 times the value when the silver was directly applied to silicon monoxide. In addition, with the above combination no peeling or separation of the different component parts of the composite structure under high frequency operation have been observed.

What I claim as new and desire to secure by Letters Patent of the United States is:

1. A magnetic transducer device for transducing high frequency signals to or from a magnetizable record medium comprising:

a head formed of a first and a second pole piece portion each having at least one planar end face;

means securing said pole piece portions together in aligned confronting closely spaced relationship to form a substantially closed magnetic core path with the said planar end faces defining a transducer gap in said substantially closed magnetic path across which said record medium moves during a transducing operation;

each of said planar end faces having intimately secured thereto a film of electrically insulating material having a volume resistivity of about $1 \times 10^{12}$ ohm-cm., or higher, said film having an oxide surface on its outer face away from said planar end face;

a thin intermediate bonding layer intimately secured to the outer face of each of said films by chemical and mechanical bonds, the outer faces of said thin intermediate bonding layers away from said films being substantially free of oxide;

an electrically conductive coating of a material having an electrical conductivity of about 3.0 micro ohm-cm., or better, intimately secured to at least one of said outer faces of said intermediate bonding layers;

said insulating films, said intermediate bonding layers and said at least one conductive coating completely filling said transducing gap; and coil means associated with said magnetic core path.

2. A magnetic transducer head as set forth in claim 1, wherein said pole piece portions are laminated.

3. A magnetic transducer head as set forth in claim 1, wherein said pole piece portions are comprised of ferrite material.

4. A magnetic transducer head as set forth in claim 1, wherein the resistivity of said conductive coating is lower than if said coating were applied directly to said film.

5. A magnetic transducer head as set forth in claim 1, wherein said film of electrically insulating material, said intermediate bonding layer, and said conductive coating are non-magnetic.

6. A magnetic transducer head as set forth in claim 5, wherein said electrically conductive coating is selected from the group consisting of gold, aluminum, silver, and copper.

7. A magnetic transducer head as set forth in claim 5, wherein said intermediate bonding layer is selected from the group consisting of titanium, chromium, hy mu 80, titanium dioxide, and iron oxide.

8. A magnetic transducer head as set forth in claim 5, wherein said film is selected from the group consisting of silicon, silicon monoxide, quartz, glass, mica, epoxy cements and small glass or sapphire beads.

9. A magnetic transducer head as set forth in claim 8, wherein said electrically conductive coating being selected from the group consisting of gold, aluminum, silver and copper.

10. A magnetic transducer head as set forth in claim 9, wherein said intermediate bonding layer is selected from the group consisting of titanium, chromium, hy mu 80, titanium dioxide, and iron oxide.

11. A magnetic transducer head as set forth in claim 10, wherein the resistivity of said conductive coating is lower than if said coating were applied directly to said film.

12. A magnetic transducer device for transducing high frequency signals to or from a magnetizable record medium comprising:

a head formed of a first and a second pole piece portion each having at least one planar end face;

means securing said pole piece portions together in aligned confronting closely spaced relationship to form a substantially closed magnetic core path with said planar end faces defining a transducer gap in said substantially closed magnetic path across which said record medium moves during a transducing operation;

each of said planar faces having intimately secured thereto a film of electrically insulating material selected from the group consisting of silicon, silicon monoxide, quartz, glass, mica, epoxy, magnesium fluoride, sapphire and glass beads, said films having a characteristic of their outer faces away from said planar end faces not readily adhering to silver at thicknesses over about 10 millionths of an inch;

a thin intermediate bonding layer intimately secured to said outer face away from said planar end face selected from the group consisting of titanium, chromium, hy mu 80, titanium dioxide, and iron oxide, the outer face of said intermediate bonding layer away from said insulator layer having the characteristic of readily adhering to silver of thickness of about 10 millionths of an inch and greater;

a coating layer of silver having a thickness in excess of about 10 millionths of an inch intimately secured to said outer face of said intermediate bonding layer;

said film, said thin intermediate bonding layer and said coating layer completely filling said transducer gap and all being non-magnetic.

13. A magnetic transducer device as set forth in claim 12, wherein said resistivity of said coating layer is lower than said coating layer of silver directly applied to said film.

14. A magnetic transducer head as set forth in claim 12, wherein said pole piece portions are laminated.

15. A magnetic transducer head as set forth in claim 12, wherein said pole piece portions are comprised of ferrite material.

References Cited

UNITED STATES PATENTS 3,246,384 4/1966 Vice ............. 179—100.2

FOREIGN PATENTS 902,063 7/1962 Great Britain.

BERNARD KONICK, Primary Examiner

J. P. MULLLINS, Assistant Examiner

U.S. Cl. X.R.

340—174.1; 346—74